United States Patent [19]
Deveaux

[11] Patent Number: 6,047,665
[45] Date of Patent: Apr. 11, 2000

[54] MULTI-CHILD MODULAR TETHER-HARNESS COMBINATION

[76] Inventor: Linda J. Deveaux, 15 Milton St., Waltham, Mass. 02454

[21] Appl. No.: 09/144,047

[22] Filed: Aug. 31, 1998

[51] Int. Cl.[7] .......................... A62B 35/00; B60R 22/00; B60R 22/12
[52] U.S. Cl. .......................................................... 119/770
[58] Field of Search ..................... 119/770, 776, 119/772, 792, 795, 797, 857; 24/31 R, 298, 301, 302, 312, 313

[56] References Cited

U.S. PATENT DOCUMENTS

| | | | |
|---|---|---|---|
| D. 383,256 | 9/1997 | Hampton | D30/153 |
| 2,275,983 | 3/1942 | Nadeau | 119/771 |
| 3,563,208 | 2/1971 | Bero | 119/770 |
| 4,273,215 | 6/1981 | Leggett | 119/770 |
| 4,308,629 | 1/1982 | Freemon | 441/111 |
| 4,563,981 | 1/1986 | Kramer | 119/770 |
| 4,666,017 | 5/1987 | Zimmerman | 119/770 |
| 4,667,624 | 5/1987 | Smith | 119/770 |
| 4,788,941 | 12/1988 | Villeneuve | 119/771 |
| 4,879,972 | 11/1989 | Crowe et al. | 119/771 |
| 4,892,063 | 1/1990 | Garrigan | 119/770 |
| 5,069,168 | 12/1991 | Robertson et al. | 119/770 |
| 5,351,654 | 10/1994 | Fuentes | 119/770 |
| 5,423,292 | 6/1995 | Hall | 119/770 |
| 5,447,121 | 9/1995 | Spence | 119/770 |
| 5,456,213 | 10/1995 | Beauchamp | 119/793 |
| 5,551,379 | 9/1996 | Hart | 119/771 |
| 5,613,467 | 3/1997 | Arakawa | 119/792 |
| 5,632,234 | 5/1997 | Parker | 119/795 |
| 5,666,909 | 9/1997 | Dupre | 119/797 |
| 5,678,739 | 10/1997 | Darling et al. | 224/160 |
| 5,701,848 | 12/1997 | Tozawa | 119/797 |
| 5,711,107 | 1/1998 | Louisiana | 47/45 |
| 5,718,190 | 2/1998 | Tinker | 119/771 |
| 5,806,467 | 9/1998 | Arakawa | 119/771 |
| 5,813,367 | 9/1998 | O'Brien | 119/770 |
| 5,842,444 | 12/1998 | Perulli | 119/770 |
| 5,852,988 | 12/1998 | Gish | 119/795 |
| 5,896,831 | 4/1999 | Alpert | 119/856 |
| 5,901,668 | 5/1999 | Goodger, Sr. | 119/795 |

FOREIGN PATENT DOCUMENTS

| | | | |
|---|---|---|---|
| 1233020 | 10/1960 | France | 119/797 |
| 2281497 | 3/1995 | United Kingdom | 119/770 |
| WO 92/02128 | 2/1992 | WIPO | 119/792 |

Primary Examiner—Michael J. Carone
Assistant Examiner—Fredrick T. French, III
Attorney, Agent, or Firm—Mark P. White

[57] ABSTRACT

A tether-harness combination is intended to restrain a group of children to provide security for the group during excursions, sightseeing trips, or when walking. The tether-harness is modular, and may accommodate an indefinite number of children by adding or removing modules. The master module includes a cruciate junction connector which mates, by quick-release connectors, with a master restraint strap held by a teacher, counselor, or other monitor controlling the children. The junction connector is also attached to one or more harnesses by similar quick-release connectors, and each harness used to harness a child to the device. In addition to the master module, the device includes an indefinite number of slave modules. Each slave module is attached to an adjacent module, using quick-release connectors, and a longitudinal connecting strap. Each slave module is also attached to one or more harnesses, these attachments also being made by quick-release connectors.

7 Claims, 5 Drawing Sheets

MULTI-CHILD MODULAR TETHER-HARNESS COMBINATION

FIELD OF THE INVENTION

This invention relates to childrens' safety harnesses in general, and more specifically, such to harnesses used to restrain young children in groups.

BACKGROUND OF THE INVENTION

Description Relative to the Prior Art

The prior art teaches a variety of different devices for tethering or harnessing small children. These include,tethers or leashes intended to allow a child to walk alongside a parent or other adult; harnesses used to carry a child on the body of an adult; walking aids, providing support for a young child just learning to walk, and the like. These inventions are all intended to provide safety and restraint for children, especially preventing them from being inadvertently separated from the supervising adult.

Most of these inventions utilized straps or webs, attached to the child either at the wrist, at the waist, or, in the case of harnesses, at the torso.

The vast majority of these devices are used to restrain or support individual children. The current invention, in comparison, is used for restraining and controlling groups of indefinite numbers of children. Such a device is useful for schools, camps, or other entities which care for young children, and seek to physically control them during trips, outings, and the like.

The current invention, in the simplest form of the preferred embodiment, can be used with up to three children. However, it is modular in that it can be expanded indefinitely by adding components. The expansion in this manner is simple to use and inherently inexpensive. The entire restraint is constructed of strap or web material, with plastic quick-release connectors and junctions for adding or removing modules. And it is safe and reliable.

SUMMARY

A general object of the current invention is to provide a means for tethering a group of children for security purposes in public places, in parks, and the like. A specific object of this invention is to provide such a tethering means in the form of a modular device, so that the tethering means may be easily modified to accommodate different numbers of children, as the size of the group changes. A further specific object of this invention is to provide such tethering means in the form of a lightweight, inexpensive, easy-to-use device.

According to one aspect of the current invention, the tether-harness combination includes a master module, which is further made up of a master junction module. This master junction module is formed into a multitude of quick-release connectors, a master restraint strap having two ends, one end detachably connected by quick-release means to one of the master junction module connectors, and the other end having means for a person to hold said strap end, and one or more harness assemblies, each detachably connected by quick-release means to one of the master junction-module connectors.

In accordance with another aspect of the invention, the tether-harness combination has one or more slave modules, each containing a slave junction module. This slave junction module includes a multitude of quick-release connectors, a longitudinal connector strap having two ends, and one or more harness assemblies. The longitudinal connector strap is detachably connected by quick-release means at one end to the slave junction module, and detachably connected by quick-release means at the other end to the adjacent module. Each harness assembly is detachably connected by quick-release means to the slave junction module.

In accordance with yet another aspect of the invention, the longitudinal connector straps, the harness assemblies, and the master restrain strap are made of flexible web material.

According to still another aspect of the invention, the longitudinal connector straps and the master restrain strap are of adjustable-length.

According to yet another aspect of the invention, each of the harness assemblies are made up of a multiplicity of flexible straps, each of which is of adjustable length, each having a bound end and a terminating end, with the bound end of each attached to a common point, and the common point attached to the junction connector. There are also a multiplicity of quick-release connectors, one connector attached to each terminating end.

According to a final aspect of the invention, the quick-release connectors are of a male type, or plug, and a female type, or socket, with the plug engaging a socket for each connection.

BRIEF DESCRIPTION OF THE DRAWINGS

These, and further features of the invention, may be better understood with reference to the accompanying specification and drawings depicting the preferred embodiment, in which.

PREFERRED EMBODIMENTS

In the following description, the reference numbers used are as shown in the table below:

| Reference No. | Description |
| --- | --- |
| 2 | longitudinal connector strap |
| 4 | junction connector |
| 6 | harness assembly |
| 10 | handle |
| 11 | terminating end of the master restraint strap |
| 12 | plug assembly |
| 13 | harness assembly common point |
| 14 | socket connector |
| 16 | junction connector socket |
| 18 | master restraint strap |
| 19 | harness assembly webs |
| 22 | outer prongs |
| 24 | central prong |
| 30 | central guide slot |
| 32 | recesses |
| 34 | buckle |
| 36 | sleeve |

-continued

| Reference No. | Description |
|---|---|
| 38 | integrally formed buckle |
| 40 | wrist strap |
| 42 | X-shaped torso harness |
| 112 | parallel arm |
| 121 | longitudinal arm |

Figure 1:
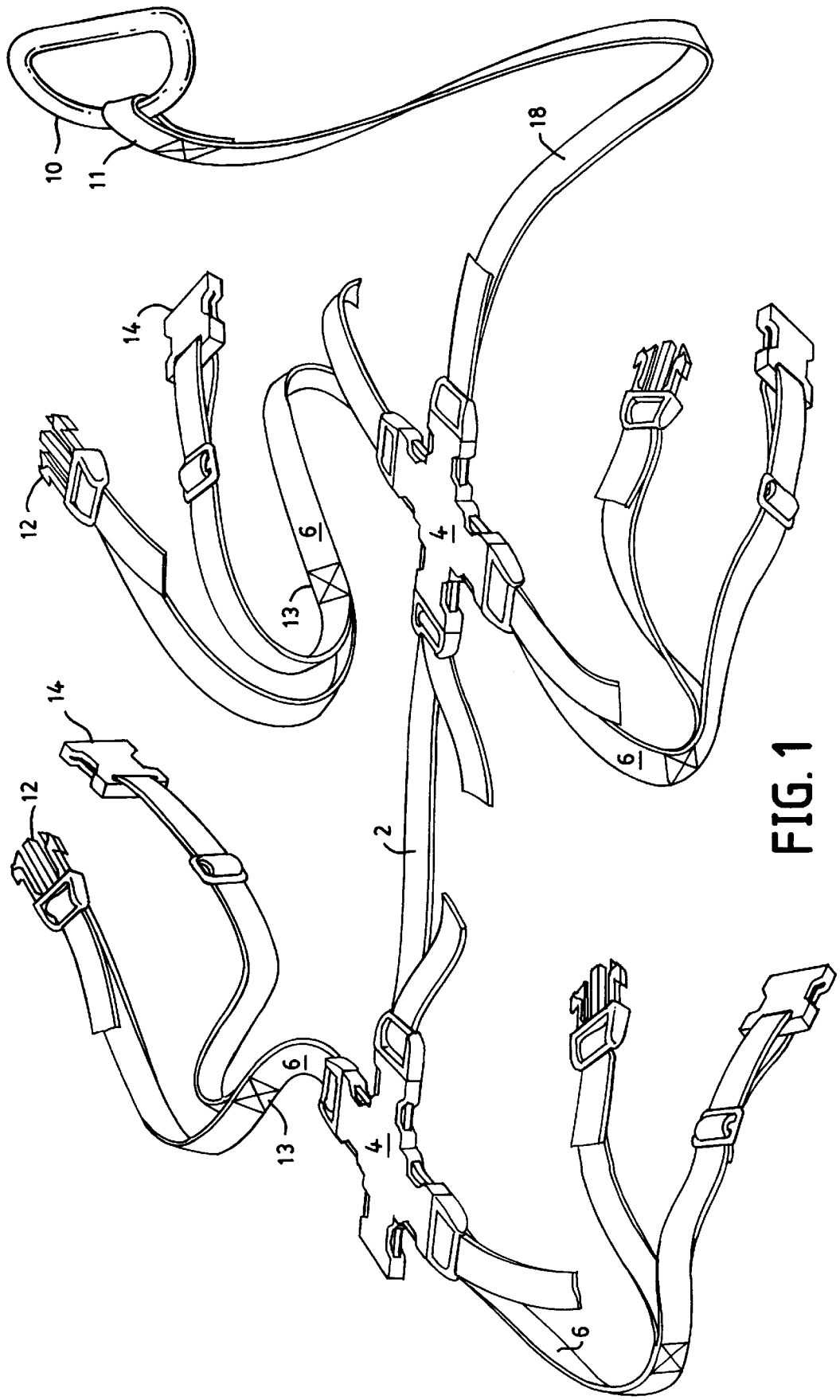
FIG. 1 depicts a perspective view of the invention, attached with quick-release connectors.

The invention may be understood by first referring to FIG. 1, which depicts a perspective view of the invention.

The preferred embodiment is constructed from flexible woven straps, or webs, which may be made of plastic, such as nylon, or natural fibers, such as cotton, wool, or the like. Such straps are commonly used today for many different purposes, and in conjunction with many different articles, including luggage, backpacks, etc. Such straps are also included as parts of many of the inventions mentioned above in the section entitled "DESCRIPTION RELATIVE TO THE PRIOR ART".

The straps make several different elements of the invention, including the longitudinal connector straps 2, the harness assemblies 6, and the master restrain strap, 18.

The various straps and strap assemblies are interconnected by means of the junction connectors 4. These junction connectors form the basic unit or module of this invention, which is made up of as many modules as desired, indefinitely expanding the number of children which may be tethered with this invention.

Figure 5:
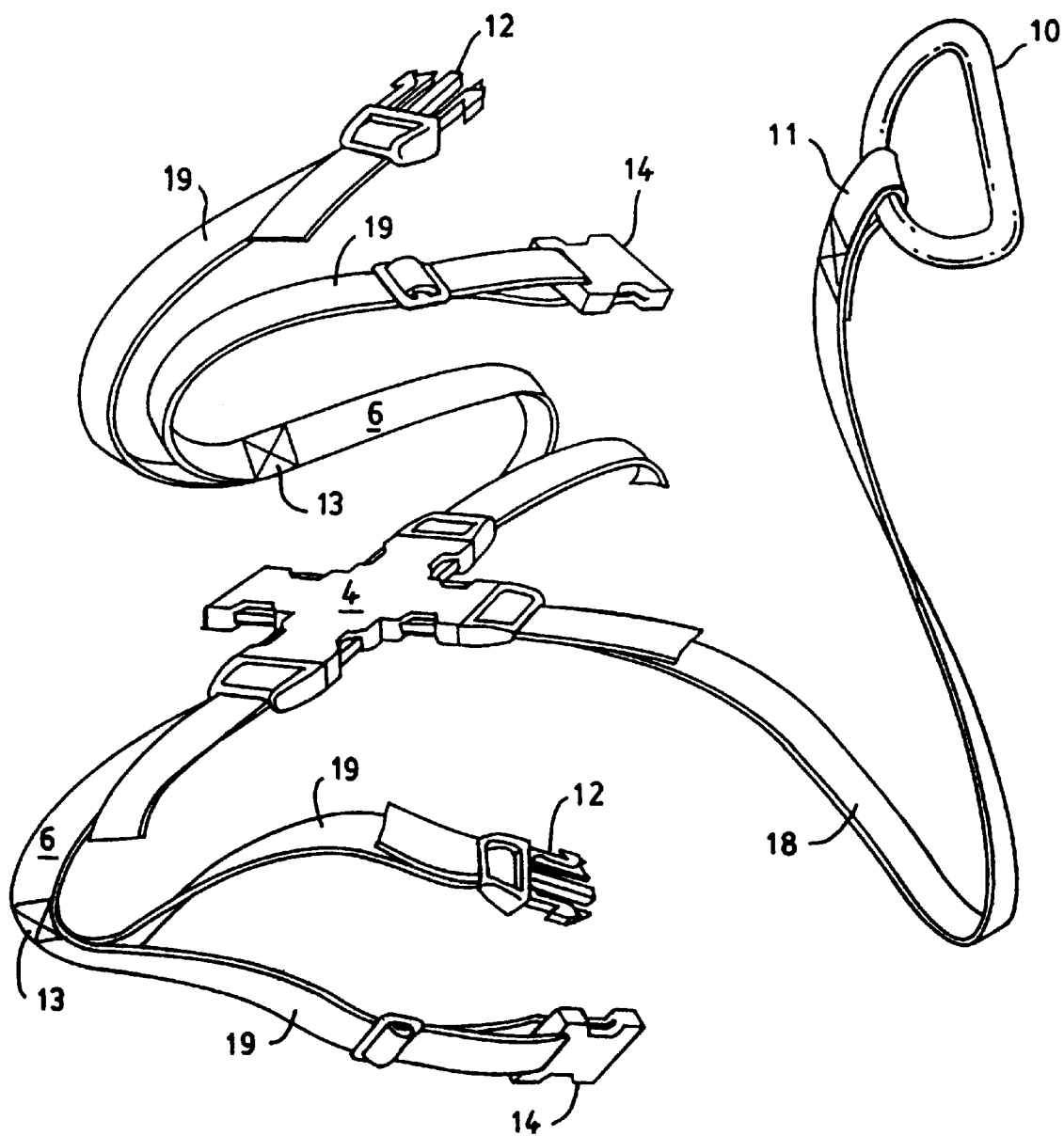
FIG. 5 depicts the invention in its simplest form, with a master module only.

In its most basic form, a single junction module is used, as shown in FIG. 5. In this basic configuration, a master restrain restraint strap 18 is attached by means of a quick-release connector to the junction module 4. A ring or handle 10 is connected to the terminating end 11 of the master restrain strap to enhance ease and comfort of use of the invention.

One or more harness assemblies 6 are connected to the junction module as well. As seen in FIG. 5, each harness is formed of two harness straps or webs 19 which are fastened together at a common end 13. At the other, or free end of each harness strap is a quick-release connector. In the embodiment of this FIG. 5, the terminating end of one of the harness straps uses a male or plug connector 12, and the terminating end of the other strap utilizes a female, or socket connector 14. The complete assembly, as described above, may be described as a "master module".

The invention may be expanded, as shown in FIG. 1, by the inclusion of an indefinite number of "slave modules", each constructed from the same components as the master module: a junction connector 4, and harness assemblies 6. In addition, a longitudinal connector strap 2 is used to interconnect adjacent slave modules. Only a single master restraint strap 18 is required for use of the invention, regardless of how many slave modules are included.

Figure 2:
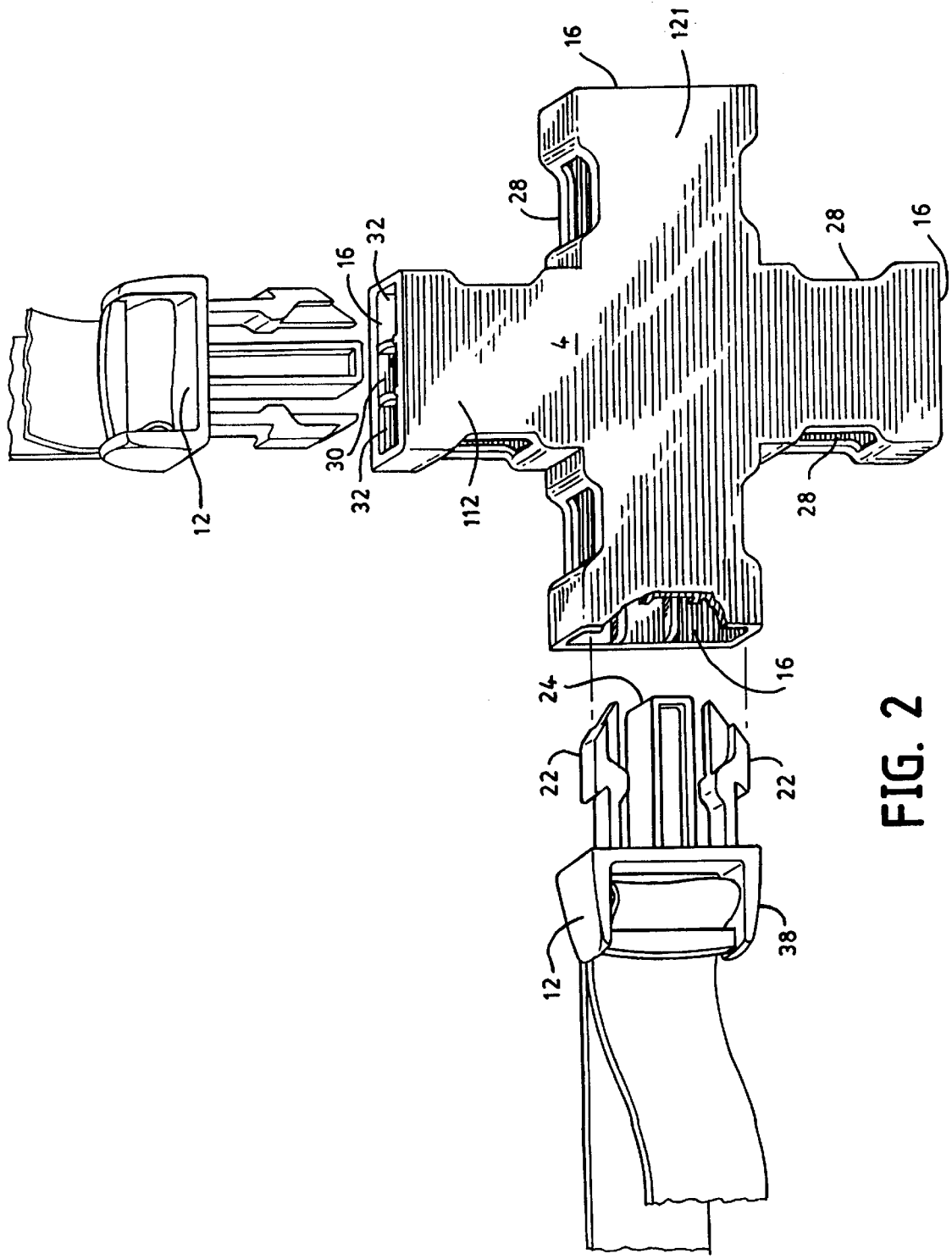
FIG. 2 depicts the interconnection of the junction connectors with the longitudinal straps and the harness assemblies.

As is seen by referring to FIG. 2, each junction connector is in the form of a cruciate-form assembly, with each of the arms of the assembly containing an identical quick-disconnect socket 16. The junction connector has two longitudinal arms 121, and two parallel arms 112. Each longitudinal straps attaches, by means of quick disconnect plug 12, to a longitudinal arm of the junction connector 4. Each harness assembly strap attaches, by means of quick disconnect plug 12, to a parallel arm of the junction connector. Any number of junction connectors may be used in this application. The type of quick-disconnect connector shown in FIG. 2 is similar to that described in U.S. Pat. No. 5,170,539 (Lundstedt et al.) The female socket, as described in said patent, is free-standing, and intended to attach to a strap or web. However, in the present invention the socket is integrally formed into the junction connector.

Still referring to FIG. 2, the male portion has three arms, or prongs, two outer prongs 22, and one central prong, 24. The outer prongs latchingly mate with a female socket 16, having a recessed portion 28 which captures the two outer prongs. The female socket also contains a central guide slot 30, into which the central prong is inserted. The female socket further contains two recesses 32, which allow the user to unlatch the male portion. The user compress the outer prongs 22 by squeezing them through the recesses 32.

A number of alternative types of quick connectors are equally appropriate for use with the current invention. The requirements of such connectors is that they be inexpensive to manufacture, corrosion resistant, and safe to handle.

Figure 4:
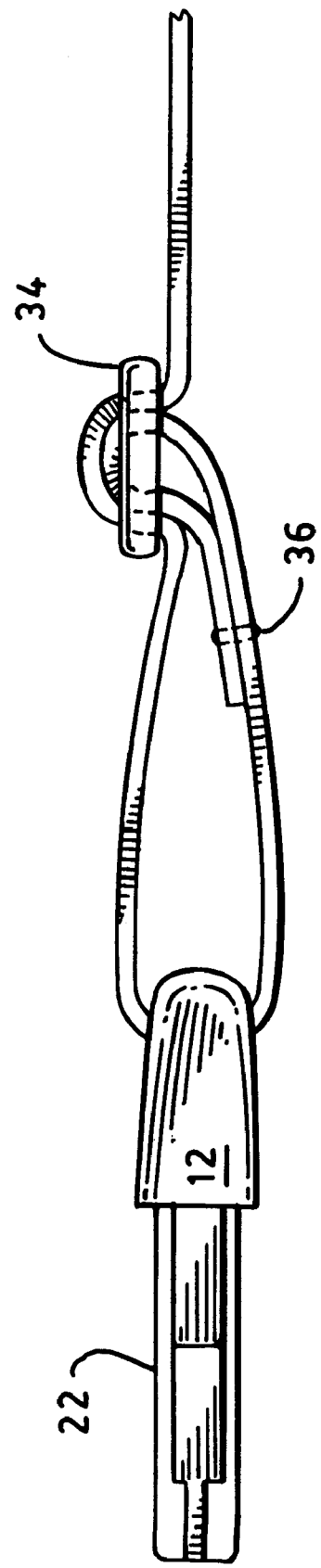
FIG. 4 depicts a strap adjustment using buckles

The straps are made adjustable by any of several well-known methods. As shown in FIG. 4, one of the most common means is by use of a metal or plastic buckle 34, together with a sleeve 36 attached to the terminating end of the strap.

The straps shown attached to the plugs 12, as depicted in FIG. 2, illustrate another means of adjustment, namely, by using a buckle 38 integrally formed into the plug assembly 12.

The key to this invention is the modular nature of the device. Because of the ease of engaging and disengaging the quick-release connectors, the user may add or remove as many junctions as required. The first, or end junction connector, must have attached the master restraint strap, and there must be at least one harness assembly attached as well for the apparatus to be used. This simplest configuration may be augmented by adding a second and third harness assembly. When a fourth harness assembly is desired, an additional junction connector must be added by means of a longitudinal connector strap connected to the longitudinal arm opposed to the arm containing the master restraint strap.

Figure 3:
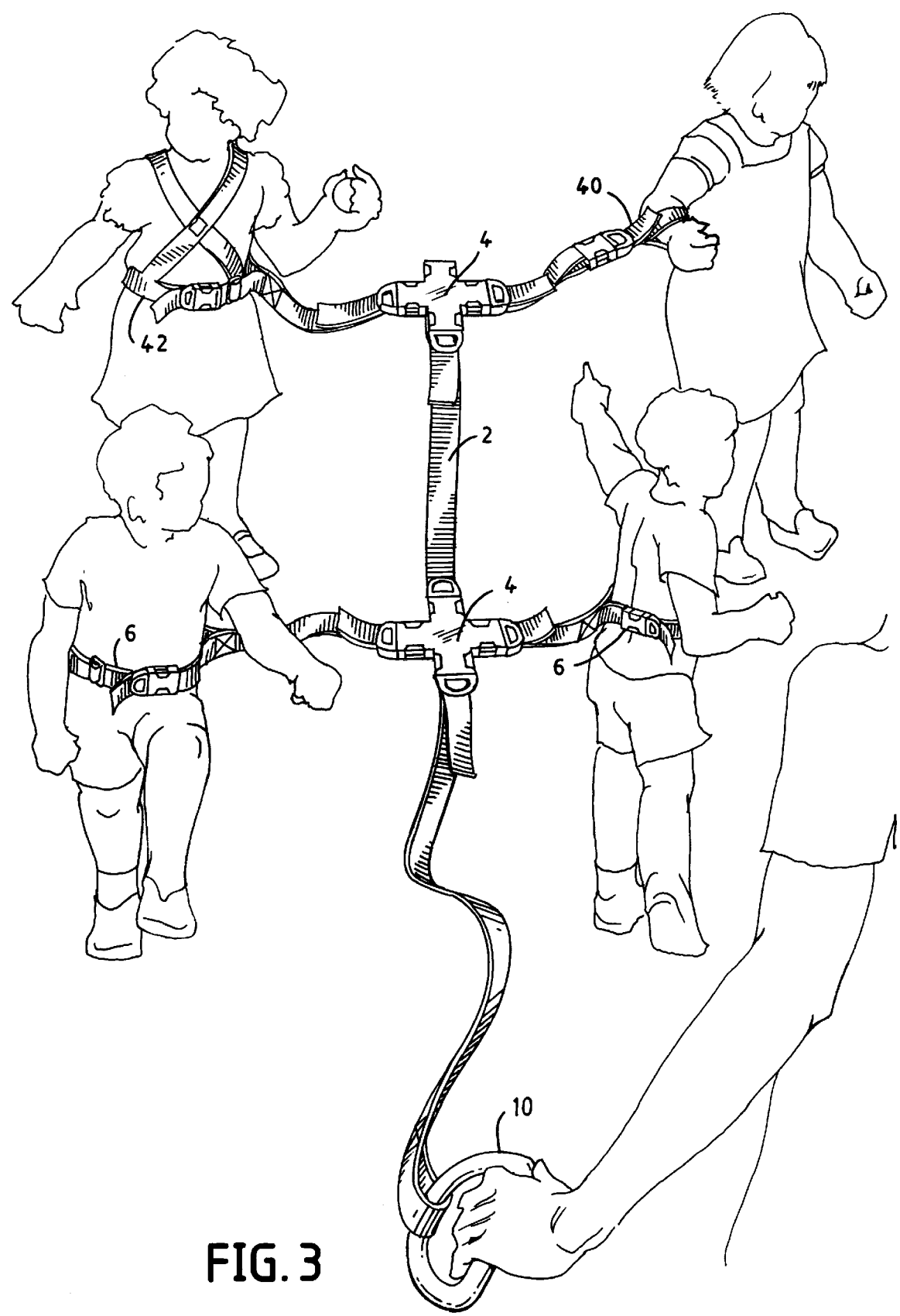
FIG. 3 depicts the harness assembly used to restrain several children.

FIG. 3 shows the invention as used with a number of children. As seen in FIG. 3, the harness assemblies may be of any type, or combination of types, desired. In FIG. 3, a wrist strap 40 is used as a harness assembly for one of the children, while an "X"-shaped torso harness 42 is used for one of the other children. The remaining two children are wearing the waist harness assemblies 6 depicted in FIGS. 1 and 5.

Alternative embodiments utilize Velcro® in the harness modules to assist in securing the harness assembly about the child. Velcro can also be used to assist in the adjustment of the various straps which make up this invention, including the harness assembly, the longitudinal strap, and the master restraint strap.

It will be apparent that improvements and modifications may be made within the purview of the invention without departing from the scope of the invention defined in the appended claims.

I claim:

1. A tether-harness combination comprising:
    (a) a master assembly, further comprising:
        (i) a master junction module which further comprises a multiplicity of quick-release socket connectors;
        (ii) a master restraint strap having a first end detachably connected by quick-release plug means to the master junction module, and a second end further comprising a handle;

(b) one or more slave assemblies, each further comprising:
  (i) a slave junction module, each of which further comprises a multiplicity of quick-release socket connectors; and
  (ii) a longitudinal connector strap, having a first end detachably connected by quick-release plug means to one of said slave junction modules, and a second end detachably connected, by quick-release plug means, either to the master junction module, or to another slave junction module; and
(c) one or more harness assemblies, each of which is connected by quick release plug means either to the master junction module, or to one of the slave junction modules.

2. The tether harness combination of claim 1, wherein the longitudinal connector straps and the master restraint strap further comprise flexible web material.

3. The tether harness combination of claim 2, wherein the longitudinal connector straps further comprise adjustable length straps, and wherein the master restrain strap further comprises an adjustable-length strap.

4. The tether-harness combination of claim 3, wherein the harness assemblies further comprise one or more wrist straps.

5. The tether-harness combination of claim 3, wherein the harness assemblies further comprise one or more X-shaped torso harnesses.

6. The tether-harness combination of claim 3, wherein each of the harness assemblies further comprises: a multiplicity of flexible web straps, each having a bound end and a terminating end, the bound end of each strap being attached to a common point; and quick-release means to affix the terminating ends about children constrained by the tether-harness combination.

7. The tether-harness combination of claim 6, wherein the quick-release means to affix the terminating ends of the harness assemblies about the children further comprises plug and socket means.

\* \* \* \* \*